United States Patent

Furst

[15] 3,644,909

[45] Feb. 22, 1972

[54] DRIVE ARRANGEMENT FOR READ-ONLY MEMORY

[72] Inventor: Jozef Furst, Mission Viejo, Calif.

[73] Assignee: Datapac, Incorporated, Santa Ana, Calif.

[22] Filed: Aug. 10, 1970

[21] Appl. No.: 62,519

[52] U.S. Cl. ............340/174 SP, 340/174 AB, 340/174 AD, 340/174 DC, 340/174 RC

[51] Int. Cl. ..........................................................G11c 17/00

[58] Field of Search ................340/174 SP, 174 AB, 174 DC, 340/174 AD, 174 RC

[56] References Cited

UNITED STATES PATENTS

| | | | |
|---|---|---|---|
| 3,432,830 | 3/1969 | Owen et al | 340/174 AB |
| 3,496,556 | 2/1970 | Wennstrom | 340/174 SP |
| 3,508,217 | 4/1970 | Dorey | 340/174 SP |
| 3,541,681 | 11/1970 | Haverbach | 340/174 SP |

*Primary Examiner*—James W. Moffitt
*Attorney*—Fowler, Knobbe & Martens

[57] ABSTRACT

A linear transformer read-only memory of the type having an array of magnetic cores linked in different combinations by a large number of drive lines. Each core is also linked by an individual sense winding. Whenever a particular drive line is pulsed, the resultant current produces an output across the sense windings of those cores which that drive line links.

Several of the drive lines are pulsed through a common current-limiting resistor. Leakage currents in nonpulsed drive lines are reduced by an auxiliary load which is controlled to draw current through the common current-limiting resistor when none of the drive lines connected to that resistor is pulsed.

12 Claims, 5 Drawing Figures

INVENTOR.
JOZEF FURST

BY
FOWLER, KNOBBE & MARTENS
ATTORNEYS.

INVENTOR.
JOZEF FURST
BY
FOWLER, KNOBBE
& MARTENS
ATTORNEYS.

INVENTOR
JOZEF FURST
BY
FOWLER, KNOBBE
& MARTENS
ATTORNEYS.

INVENTOR.
JOZEF FURST

BY
FOWLER, KNOBBE & MARTENS
ATTORNEYS.

DRIVE ARRANGEMENT FOR READ-ONLY MEMORY

The present invention relates to an improvement in read-only memories as distinguished from memories of the type into which information can be written as well.

In order to appreciate the advantages and special problems of read-only memories, it is helpful to consider briefly the read-write type of magnetic core memory. An example of this type of memory is described in U.S. Pat. No. 2,736,880 issued to J. W. Forrester. Typically it includes a stack of several magnetic core memory planes, all of which have magnetic cores arranged in corresponding rows and columns. Within each memory plane all of the cores in a given row are linked, i.e., threaded through, by an individual row drive line and similarly all cores in a given column are linked by an individual column drive line. Usually the memory if organized to store a multibit "word" of information in each group of cores which are correspondingly located in the several memory planes so that one bit is stored in each core. The number of words which can be stored in the memory will equal the number of correspondingly located memory cores, that is, the number of cores in a single memory plane.

Assuming for example a magnetic core memory stack having four memory planes, each with 16 cores arranged in four rows and four columns, the memory will be capable of independently storing 16 words, each word having four bits of information distributed between correspondingly located cores in the four planes.

A word is written into memory for storage by switching a selected plurality of cores at a given address, or location, into a particular one of two bistable magnetic states. This may be achieved by concurrently sending a current pulse in a particular direction through the row and column drive lines linking the selected cores. To read information stored at a particular address, a pulse of current is concurrently sent in the opposite direction through the row and column drive lines linking the cores at that address. Those cores which had not been switched during the writing operation will be unaffected, while the remaining cores at the interrogated address will have their magnetic states reversed during the reading operation. This reversal of magnetic state is detected by sense windings of which there is a respective one in each of the four memory planes.

It is worthy of note that in a typical magnetic core read-write memory, each core is linked by only two drive lines, and stores only one bit of information, that information is stored by reversing the magnetic state of a core, and that a large number of different words can be stored successively in every work location in the memory.

A read-only memory is one in which information is permanently stored and from which information can be repetitively read. The present invention is concerned with improvements in linear transformer read-only memories which resemble read-write magnetic core memories in that they too utilize magnetic cores. There are, however, fundamental differences. First, information is stored in a read-only memory, not by switching the cores between their two stable magnetic states, but by simple transformer action in which current through a drive line coupling a given core is detected by a sense line coupling only that core. Secondly, instead of a matrix of magnetic cores threaded by row and column drive lines, the linear transformer read-only memory has an array of magnetic cores, selected ones of which are coupled by a large number of drive lines. In a typical linear transformer read-only memory there may be a series of 100 magnetic cores and a bundle of 512 drive lines. Each drive line will link anywhere from none to all of the 100 magnetic cores and the combination of cores linked by a given drive line will represent the binary information stored in the linear transformer read-only memory by virtue of that particular drive line. Each drive line is connected to a current source through a separate switch or switches so that it may be driven to the exclusion of all other lines thereby causing the data encoded by it into the cores of the memory to be read out. It is notable that each core stores as many bits of information as there are drive lines because each core serves to store a given bit location of a "work" associated with each one of the 512 drive lines linking the linear transformer read-only memory. This large increase in the use made of each core is a direct result of the fact that each core is linked not by a single drive line and a single column line, but by hundreds of drive lines. It is also significant that information is stored in a particular core of the linear transformer read-only memory by the selective threading or bypassing of that core by the drive lines of the memory, rather than by switching of the core.

The much larger storage capability of a core in the linear transformer read-only memory is achieved partly at the expense of flexibility, since the information stored is physically encoded by the location of the drive lines and can be changed only by physically rearranging them. Additionally, the large number of very closely spaced drive lines and the correspondingly large number of drive current control switches found in the linear transformer read-only memory results in very high capacitances and induced currents between the lines and through the leakage capacitances associated with those switches. Since many drive lines are pulsed from a common current source, a current pulse through a selected drive line has the effect of causing a voltage disturbance or variation across the unselected drive lines, causing capacitive charge and discharge currents to flow through them. Where several unselected drive lines link the same core and that core is not linked by the selected drive line, the cumulative effect of these charge currents can cause a false signal to appear across the sense winding of that core. The presence of false signals, even though smaller than the valid signals, necessitate that they be distinguished on the basis of magnitude. Since a valid signal takes a finite time to reach a magnitude which is higher than that of a false signal, this method of signal discrimination introduces an undesirable time delay into the circuitry associated with the memory.

In accordance with the present invention, the flow of capacitive currents through unselected drive lines in minimized, and hence memory speed is increased, by drawing a compensating current from the current source when none of the drive lines is receiving current therefrom. When a selected drive line is connected across the current source so as to receive a drive current, the compensating current is cut off. Thus, the voltage variation due to the drawing of a drive current pulse from the current source through a selected drive line is minimized. This minimization is further enhanced by making the compensating current comparable in size to the individual drive currents drawn through the drive lines. Toward this end, and according to a particular feature of the present invention, the compensating current is caused to be drawn from the current source by means of an auxiliary load which is connected to the current source and which is switched to draw current therefrom only when none of the drive lines are being driven. To make the compensating current comparable to the drive currents, the auxiliary load is selected to have approximately the same resistance and reactance as the drive lines. Since there is normally a significant variation between the impedance characteristics of the several drive lines linking the cores of the memory, the auxiliary impedance will usually be selected to represent the average impedance of the several drive lines.

The invention may be more clearly understood with reference to the following description of a preferred embodiment thereof taken in conjunction with the accompanying drawings in which.

Figure 1:
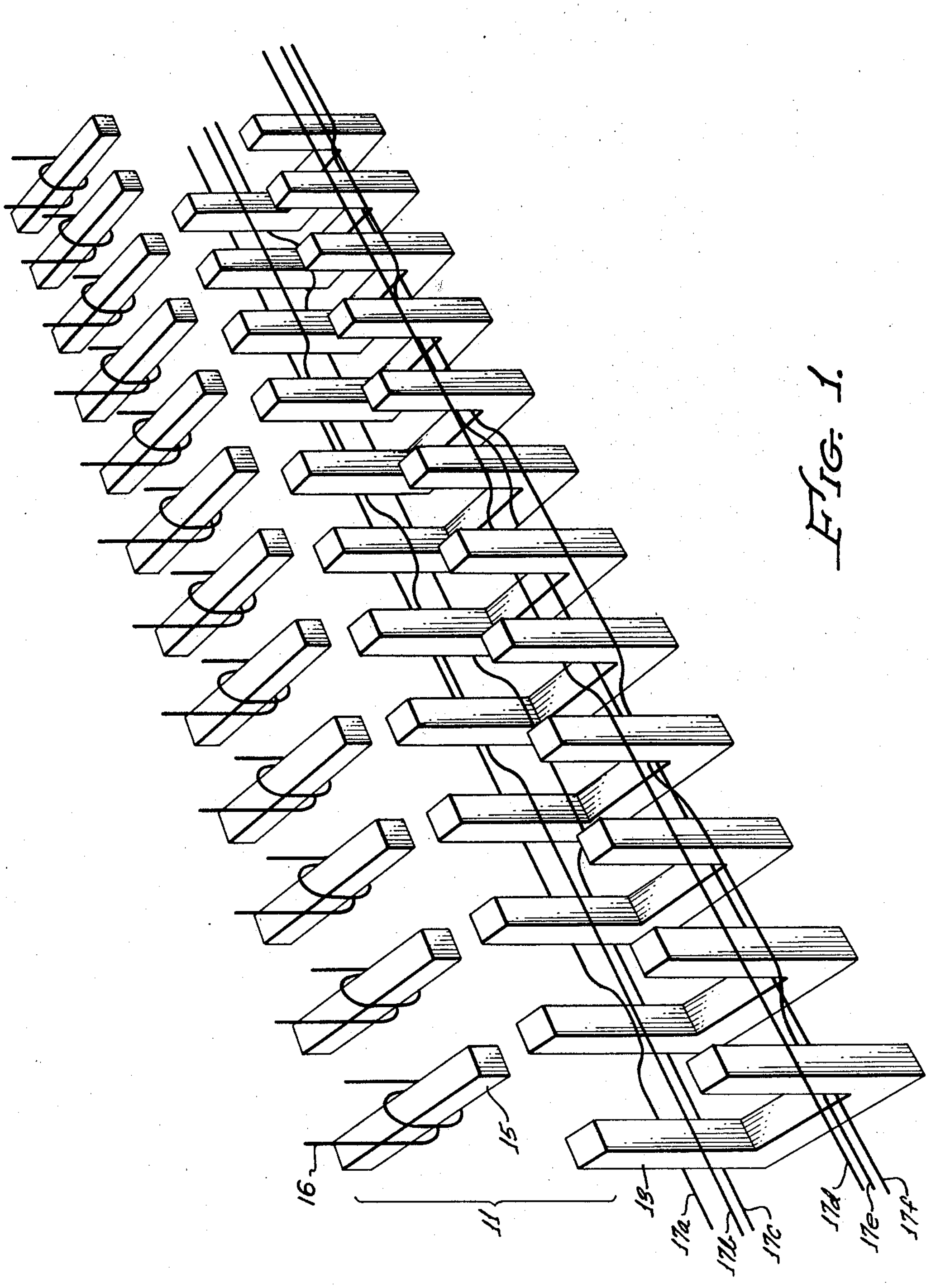
FIG. 1 is a perspective schematic diagram illustrating the general arrangement of a linear transformer read-only memory.

The basic concept of the linear transformer read-only memory is illustrated in FIG. 1. It is comprised principally of a plurality of magnetic cores 11 each of which consists of a U-shaped core piece 13 and an I-shaped core piece 15. Threaded through the core 11 are a number of drive lines, usually hundreds, of which only six, the drive lines 17*a*–17*f*, are illustrated. When the memory is in use, the I core pieces 15 are pressed tightly against the legs of their corresponding U core pieces 13 to form a continuous magnetic flux path so as to establish for each core 11 magnetic coupling between drive lines linking the cores and sense windings 16 which are wound around the I core pieces 15. Each drive line 17 is used to store a desired combination of bits in the memory. The usual arrangement is to make each core 11 represent a bit having a different binary significance. Thus, in the illustrated memory the leftmost core 11 might represent the lowest order bit, the one to its right the next higher order bit, and so on. Assume, for example, that a particular bit combination is to be encoded into the memory by means of a given word line, such as the line 17*a* and that the combination is to have a binary 1 only at its second lowest order bit, and a binary 0 at all of the other bit positions. The winding will then be threaded as shown in FIG. 1, namely it will bypass all of the cores 11 except the second one from the left. Whenever a current pulse is driven through the line 17*a*, it will be magnetically linked to the sense winding 16 of that core and to none other, and the proper bit combination will therefore appear on the sense winding 16 collectively. The line 17*b*, on the other hand, encodes, or stores, a binary 1 at the first, second, third, fourth, seventh, 10th, 11th and 12th positions and the binary 0's at the fifth, sixth, eighth and ninth positions respectively.

Figure 2:
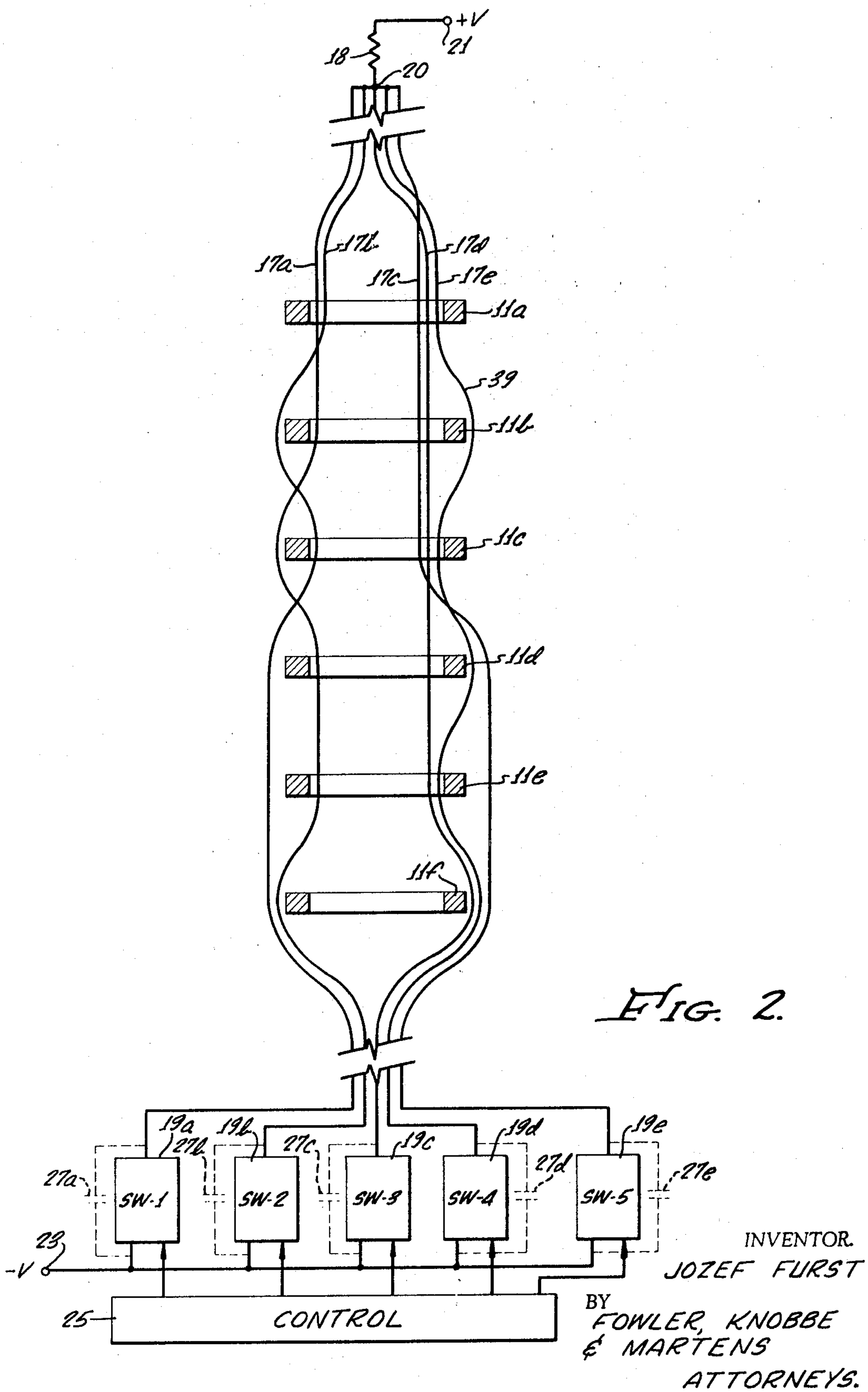
FIG. 2 is a simplified schematic diagram showing a driving circuit for a linear transformer read-only memory of the type illustrated schematically in FIG. 1.

A simplified circuit illustrating the manner in which drive lines of a linear transformer read-only memory may be driven is shown in FIG. 2. Six magnetic cores 11*a*–11*f* are shown to be linked by five drive lines 17*a*–17*e*. The sense windings of the magnetic cores 11 are not shown for sake of clarity. All of the drive lines 17 are connected at one of their ends to one end of a current-limiting resistor 18 whose opposite end is connected to the positive, +V output terminal 21 of a current source (not shown). The opposite ends of the respective drive lines 17*a*–17*e* are respectively connected through individual switches 19*a*–19*e*, labeled SW1 through SW5 to the opposite, −V terminal 23 of the same current source. The switches 19 may be selectively closed by signals applied to them from a control circuit 25. The different drive lines 17*a*–17*e* link the several cores 11*a*–11*f* in different combinations so as to encode different combinations of binary data therein. Different groups of binary data are read from the memory by closing different ones of the switches.

As will be seen in a subsequent part of this description, the switches 19 are solid-state devices such as transistors which usually have a significant amount of leakage capacitance, particularly at the very high frequencies, such as 2 megacycles, at which current pulses are switched through them. These capacitances are shown next to and in parallel with each of the switches 19 in dashed lines as the capacitances 27*a*–27*e*. A problem that tends to result from the circuit arrangement illustrated in FIG. 2 is that when a current pulse is sent through any desired one of the drive lines 17, that current pulse causes a voltage drop across the current limiting resistor 18 and in particular at the junction point 20 of the drive lines. This voltage drop, and the subsequent voltage rise at the end of the drive current pulse, cause leakage currents to flow through each of the unselected drive lines, namely those whose associated switches 19 are not closed. These leakage currents flow into and out of the leakage capacitances 27 of the switches 19. The resulting problem in terms of unwanted signal outputs on unselected cores can be particularly troublesome where a large number of drive lines which have not been selected link a particular core which is not linked by the selected drive line. Let it be assumed for example that in the simplified memory of FIG. 2 the drive line 17*a* has been selected by closing its associated drive control switch 19*a* and that none of the other drive lines have been so selected. There will be no particular problem in the case of cores 11*a* and 11*f*. The core 11*a* is linked both by the selected drive line 17*a* and by the nonselected drive lines 17*b*–17*e* so that any leakage current which flows through the unselected drive lines will tend to simply reinforce the magnetomotive force exerted by the current which flows through the selected drive line. In the case of core 11*f* on the other hand, none of the drive lines 17 links it, so that there is little magnetic coupling between any of them and the sense winding of the core, so that a current pulse through the selected drive line 17*a* will not significantly alter the output across the sense winding of the core 11*f*.

The worst possible case in FIG. 2 is illustrated by the core 11*c*. The selected drive line 17*a* does not link the core 11*c* but all of the nonselected drive lines 17*b*–17*e* do. As a result, when the drive line 17*a* is pulsed and the voltage fluctuation at the junction point 20 causes capacitive currents to flow through the drive lines 17*b*–17*e*, each of those currents will be magnetically coupled through the core 11*c* to the sense winding of that core, thus making their effects cumulative to produce a significant output on a sense winding from which an output is not desired.

In accordance with the present invention, the problem illustrated in FIG. 2 is alleviated by drawing a compensating current from the current supply terminals 21 and 23 when no current is being driven through any of the drive lines 17. The compensating current is interrupted during those periods when a drive current is being driven through one of the drive lines 17. In this way the fluctuation of voltage at the junction point 20 is greatly reduced since there is always some current flowing through the current-limiting resistor 18.

Figure 3:
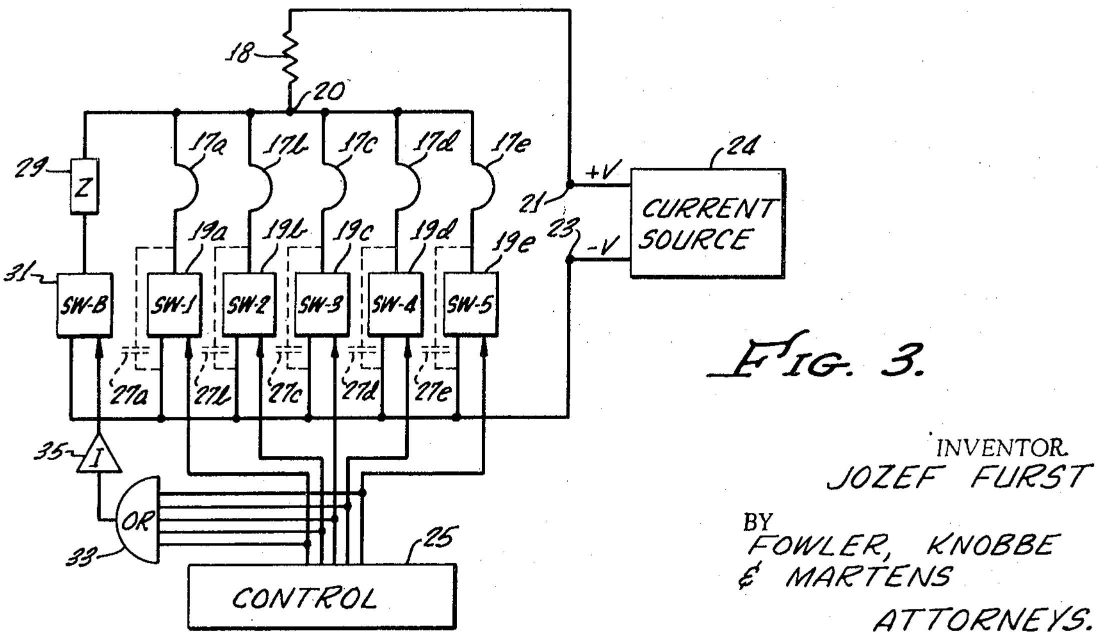
FIG. 3 is a simplified schematic diagram similar to FIG. 2 and additionally showing an auxiliary load for drawing a compensating current in accordance with the present invention.

Referring to FIG. 3, there is shown a circuit similar to that illustrated in FIG. 2 but with the drive lines 17 shown symbolically, and with cores 11*a*–11*f* being omitted for sake of clarity. Thus, current between the terminals 21 and 23 of a current source 24 is driven through the current-limiting resistor 18 and through a selected one of the drive lines 17 by closing a selected one of the switches 19 by means of the control 25. To provide the means for drawing a compensating current form the current supply, an auxiliary impedance 29 is connected through an additional switch 31 between the junction point 20 and the current supply terminal 23. The switch 31 may be of the same type as the switches 19, having a control input which, when energized, causes a current path to be established through the switch. In keeping with the invention, the switch 31 is operated so as to open when any of the switches 19 are closed and to close only when all of those switches are open. This may be achieved simply by connecting all of the lines which control the switches 19 to the inputs of an OR-gate 33, and connecting the output of the OR-gate 33 through an inverter 35 to the control input of the switch 31. Naturally, other logic arrangements could also be devised to achieve the same purpose.

Ideally, the impedance 29 will have a resistance and a reactance exactly matching the corresponding values of each of the lines 17. Usually, however, there will be some variation between the impedance values of the various drive lines of a memory since some drive lines may link only a few cores, whereas other drive lines may link a large number of them. In these cases the resistance and reactance values of the impedance 29 would be selected to fall between the lowest and highest values that are expected to be encountered, and would preferably be selected to be the average of all those values.

Figure 4:
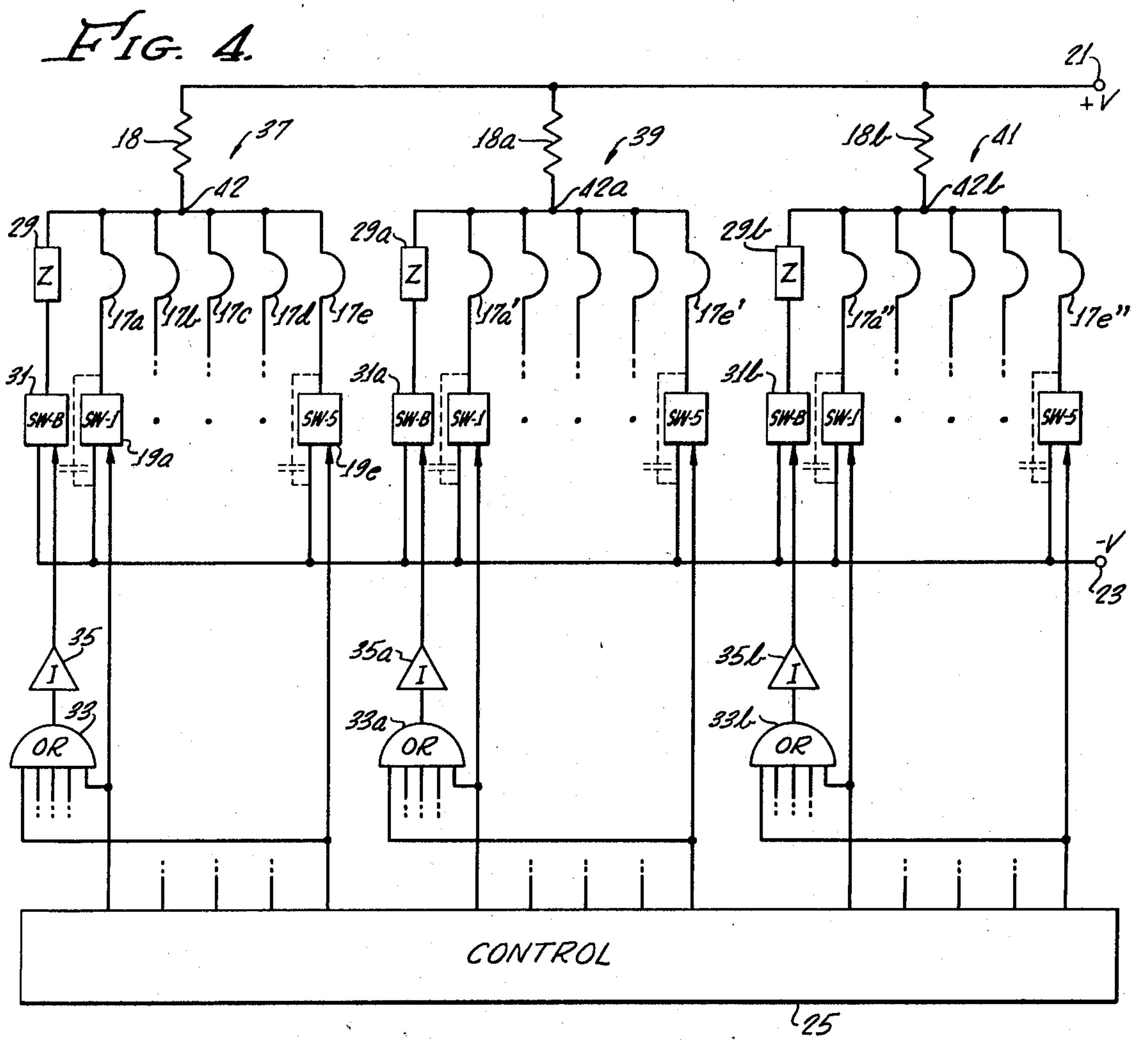
FIG. 4 is a simplified schematic diagram similar to FIG. 3 but showing the arrangement of FIG. 3 applied to a larger number of drive lines.

For reasons which are beyond the scope of the present discussion, but which are explained fully in a copending patent application, Ser. No. 62,520, filed on even date herewith by Jozef Furst and J. Kjell Hovik entitled CIRCULATING CUR- RENT MINIMIZATION SCHEME FOR A READ-ONLY MEMORY, and assigned to the assignee of the present invention, it is desirable to divide up the drive lines of a linear transformer read-only memory into several sets, each of which is like the set shown in FIG. 3. This arrangement is shown in FIG. 4 in which three sets of drive lines 37, 39, and 41 are connected respectively to receive current through three current limiting resistors 18, 18A, 18B. The first set 37 corresponds to the set shown in FIG. 3, the other two sets 39 and 41 are essentially duplicates of the first set, and each is provided with auxiliary impedance 29 of the set 37.

In the system of FIG. 4, which is exemplary only, since a typical memory will include more than three sets, each auxiliary impedance 29 is controlled by an individual switch in synchronism with the drive lines of that set. Thus, for example, the auxiliary impedance 29 is turned on so as to compensate for the presence or absence of current through the drive lines 17*a*–17*b*[, as explained with reference to FIG. 3. The same function is independently performed by the auxiliary impedance 29A so as to compensate for the switching of current through its associated drive lines 17*a'*–17*e'*, and the same also holds true for the impedance 29B in relation to drive lines 17*a''*–*e''*.

Figure 5:
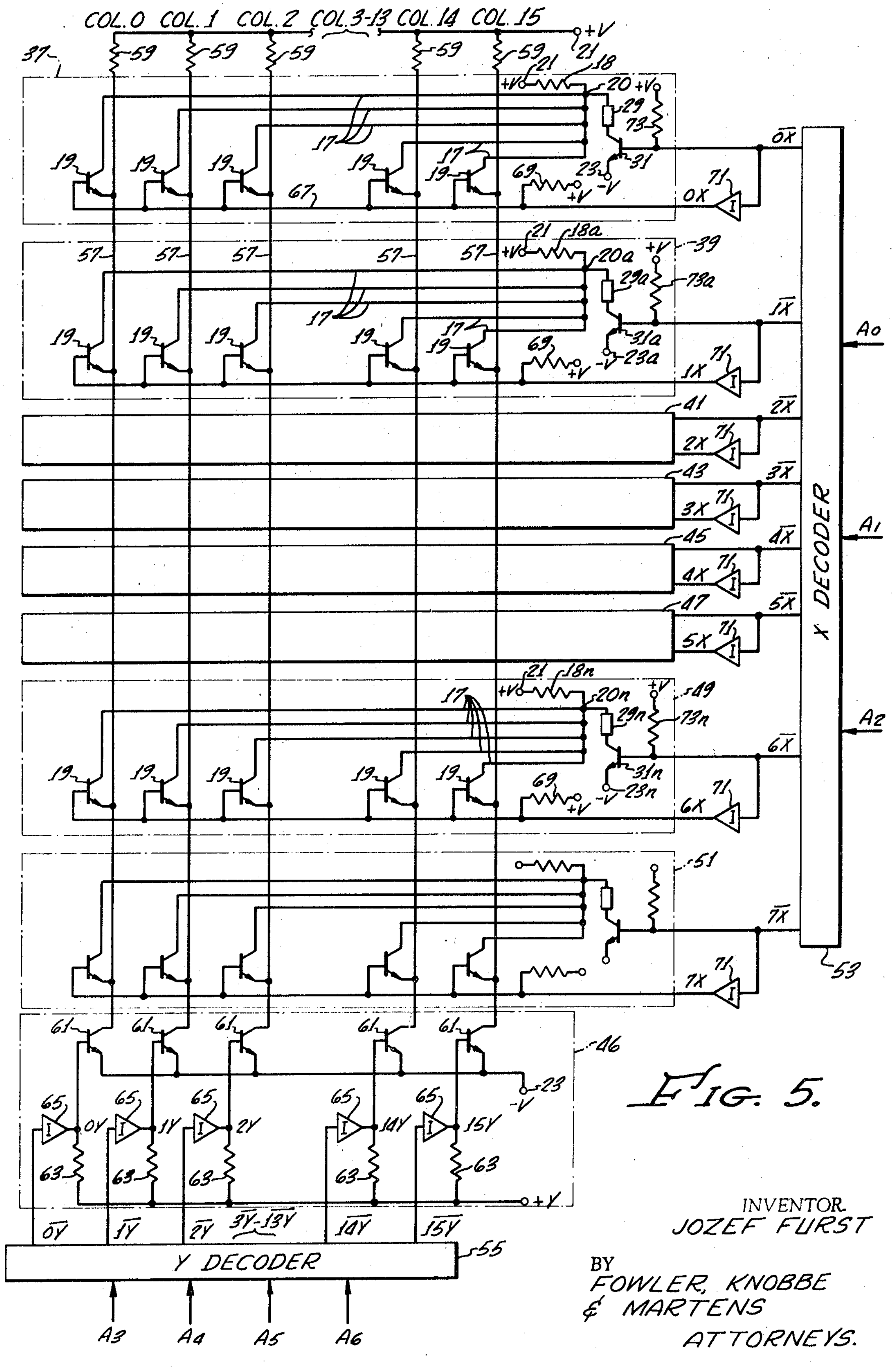
FIG. 5 is a detailed schematic diagram of a driving circuit for a linear transformer read-only memory incorporating the feature illustrated in FIGS. 3 and 4.

FIG. 5 shows an exemplary circuit following the arrangement shown generally in FIG. 4. Basically, it consists of a large number of drive lines, each of which is connected between the +V and −V potential levels through a separate transistor switch 19 whose function corresponds to the function of the switches 19 in FIGS. 3 and 4. For ease of selection, the transistor switches 19 are arranged in a matrix having several rows and columns. In the illustrated circuit there are 16 columns of switches arranged in eight rows. However, since all columns and all rows are identical, columns 3 through 13 are omitted, and rows 3 through 5 are shown in block form only.

Successive rows of switches 19 of the matrix serve to control respective sets of drive lines and correspond to the successive sets of switches of FIG. 4. Each switch 19 in the matrix has a first and a second input which must be concurrently enabled in order to close the switch. A common row control line connects the first inputs of all switches in a given row and a common column control line connects the second inputs of all switches in a given column. Thus, any switch may be selected by enabling the row and column control line to which it is connected.

The top row of transistor switches 19, the drive lines which they control, and their associated auxiliary load for drawing compensating current are all shown enclosed in a dashed line block 37 which corresponds to the group of components 37 illustrated in FIG. 4. The other seven rows of transistor switches 19 and their associated drive lines and auxiliary loads are shown in or are represented by the blocks 39–51. The drive lines, the current-limiting resistors through which they are connected to the +V potential terminal 21, and the junction points between the respective group of drive lines and their respective current limiting resistors are referenced in each of the blocks 37, 39, and 49 with the same numerals that were used to identify those components in FIG. 4.

To select a particular drive line for reading, a group of seven binary signals AO to A6 are applied to a pair of decoders 53 and 55. The X-decoder 53 converts the first three bits of the binary signal group into an output on one of its eight output lines and the Y-decoder 55 similarly converts the last four bits into an output signal on one of its 16 output lines. Each output f the X-decoder 53 serves to select a particular row of switches 19 and each output line of the Y-decoder 55 performs that function through an intermediate current switching block 46 for each column of transistor switches.

As was just noted, each transistor switch 19 in the matrix has two inputs, the emitter and the base, both of which must be enabled in order to close the switch. A series of column control lines 57 connect the first inputs (the emitters) of all switches in the respective columns and are connected at one of their ends through individual bias resistors 59 to the +V potential at terminal 21. At their opposite ends each of the column bus lines 57 is connected through the collector-emitter circuit of a respective one of a series of transistor control switches 61 in the current switching block 46 to the −V potential level maintained at the terminal 23. The transistors 61 are normally biased into nonconduction by connecting their bases through biasing resistors 63 to the +V potential level. To turn on a selected one of the transistors 19, a signal is applied to its base through an inverter 65 driven by a corresponding output of the decoder 55. The signals produced by the Y-decoder 55 on its outputs are such that when any one of them is inverted, it is operative to turn on a selected one of the transistors 61, causing the emitters of all of its associated column transistor switches 19 to be pulled down to the −V potential level which is one condition for the transistor switches in that column to be turned on.

Another condition for turning on any particular transistor switch 19 in the matrix is that its base be shifted from the level at which it is normally held. In particular, a series of row control lines 67 connect the bases of all of the transistor switches 19 in a given row through row bias resistors 69 to the +V potential level. Thus, normally the bases of all transistor switches 19 are maintained at a potential which is the same as that at which their emitters are held so that they are all biased into nonconduction. To enable the transistor switches 19 in any given row of the matrix, each of the row control lines 67 is also connected through a respective inverter 71 to a different one of the eight outputs of the X-decoder 53. When a signal is caused to appear on the output of the decoder corresponding to the selected row of transistor switches 19, it is inverted by the inverter 71 to a level which is operative to turn on the transistor 19 to the base of which it is applied, provided that the transistor is also in a column selected by the signals being applied to the Y-decoder 55.

In carrying out the present invention, an auxiliary impedance 29 is connected between the junction point 20 of each set of drive lines 17 the −V potential terminal through the collector-emitter circuit of an impedance control transistor switch 31 corresponding to the similarly numbered components in FIGS. 3 and 4. The base of the transistor 31 is connected through a base biasing resistor 73 to the +V potential level so that, in the absence of a signal at its base, the transistor is always biased to conduct. The base of each transistor 31 is also connected to a respective one of the outputs of the X-decoder 53. Although not shown, this connection is preferably through two inverters connected in series with one another so that no logical inversion occurs but there is a power amplification between the output of the decoder 53 and the base of each impedance control transistor 31. In any event, a signal on any output of the decoder 53 is operative to turn off the transistor 31 to the base of which it is connected.

In the absence of a signal on an output of the decoder 53 associated with a given row of transistor switches 19, all of the transistor switches in that row are disabled and there is no drive current through any of the set of drive lines 17 controlled by them. So long as this condition continues, the corresponding impedance control switch 31 is biased to conduct, causing a compensating current to be drawn by its associated impedance 29 from the junction point 20 and through the current-limiting resistor 18. As soon as a signal appears on the same decoder output, and assuming that a corresponding signal also appears on one of the outputs of the Y-decoder 55, one of the control switches 19 in that row will close and their associated impedance control switch 31 will open. Thus, collectively, the several auxiliary impedances 29 and their associated impedance control switches 31 are operative to maintain a compensating current through each current-limiting resistor 18 when, and only when, no drive current is drawn through it.

Each particular auxiliary impedance 29 may be selected to have a different impedance value, depending upon the average impedance value of the set of drive lines to which it is connected. Alternatively, if a less accurate approximation of the drive line currents is sufficient, all of the auxiliary impedances 29 may be made to have the same impedance value, this being selected as the average impedance of all of the drive lines 17 of the memory.

In a memory built in accordance with the invention to operate a 2 MHz and having approximately 100 cores, each with a 30-turn sense winding connected to a respective sense amplifier having 1,000 ohms input impedance, an auxiliary impedance having a resistance of 65 ohms in series with an inductance of 3.5 microhenries was found suitable to simulate the load presented by a drive line linking about 30 cores. The 65-ohm resistance served to simulate the load presented by the sense amplifiers and transformed by the linked cores to the drive lines. THe 3.5-microhenry inductance, on the other hand, served to simulate the total inductance of a drive line linking the 30 cores.

The above-mentioned auxiliary impedance also served to simulate effectively other drive lines, although they linked considerably more or less than 30 cores. This was found to be so because the need to simulate exactly the impedance of the drive lines is lessened by the fact that the current-limiting resistor 18 in series with the drive lines is usually greater than the impedance of the drive lines, Thus, in the memory under discussion the current limiting resistor had a value of 120 ohms. As a result, the current drawn by a given drive line which links only a few cores and which therefore has a relatively low impedance will be only moderately greater than the current drawn by another drive line which links many of the cores and therefore has a relatively high impedance. Therefore, an auxiliary impedance whose resistance and reactance is the average of those of all of the drive lines will be effective to draw a compensating current which is comparable to the drive current drawn through the current-limiting resistor 18 by any of the drive lines.

Alternatively, one may determine how many cores are linked by the various drive lines and what number of linked cores occur with the highest frequency. For example, it may be found that more drive lines link between 25 and 35 cores than any other number. The reactance and resistance value of a drive line linking 30 cores would then be determined and used for the auxiliary impedance.

What is claimed is:

1. In a read-only memory the combination comprising:
a. a plurality of magnetic cores;
b. a set of drive lines linking selected ones of said cores;
c. a current source;
d. an auxiliary current path having an impedance comparable to the impedance of individual ones of said drive lines;
e. means for connecting a selected one of said drive lines to draw current from said current source; and
f. means for connecting said auxiliary current path to draw current from said current source only when none of said drive lines does.

2. The combination of claim 1 characterized further in that said means for connecting a selected one of said drive lines includes:
a. a set of switches, one for each of said drive lines;
b. means for connecting all of said drive lines at one of their ends through a common point to one output terminal of said current source and at their opposite ends individually through respective ones of said set of switches to another output terminal of said current source; and
c. means for closing a selected one of said set of switches.

3. The combination of claim 2 characterized further in that said means for connecting said auxiliary current path includes:
a. an additional switch;
b. means for connecting said auxiliary current path and said additional switch in series with one another and together between the output terminals of said current source; and
c. means for closing said additional switch only when none of said set of switches is closed.

4. In a read-only memory the combination comprising:
a. a plurality of magnetic cores;
b. a current source having a pair of output terminals;
c. a set of drive lines linking selected ones of said cores and connected to a common point at one of their ends;
d. a current-limiting impedance connected between said common point and one of said output terminals;
e. a set of switches individually connected in series between the opposite ends of respective ones of said set of lines and the other of said output terminals;
f. means for closing a selected one of said switches to drive current from said source through a selected one of said drive lines;
an auxiliary current path and an additional switch connected in series with one another between said common point and the other of said output terminals; and
h. means for closing said additional switch when none of said set of switches is closed and for opening said additional switch when any of said set of switches is closed, said auxiliary current path having an impedance comparable to the individual impedances of said set of drive lines, whereby the total current through said current-limiting impedance remains substantially unchanged.

5. In a read-only memory the combination comprising:
a. a plurality of magnetic cores;
b. a current source having a pair of output terminals;
c. a plurality of sets of current conducting branches, each said set including:
  1. a plurality of electrically parallel branches, each branch comprised of a drive line linking selected ones of said cores and a drive control switch connected in series with said drive line, and
  2. an additional branch connected in parallel with said plurality of branches and comprised of an impedance element and an impedance control switch connected in series with said impedance element;
d. a separate load impedance for each said set and means for connecting each said set across said output terminals through a different one of said load impedances;
e. means for closing a drive control switch in a selected one of said sets; and
f. means for maintaining all of said impedance control switches closed so long as none of said drive control switches is closed and for opening any impedance control switch in a branch which is in parallel with a branch whose drive control switch is closed.

6. In a read-only memory the combination comprising:
a. a plurality of magnetic cores;
b. several sets of drive lines, each drive line linking selected ones of said cores;
c. a current source;
d. an auxiliary current path for each said set, each current path having an impedance comparable to the impedance of the drive lines in its associated set;
e. means for connecting a selected one of said drive lines to draw current from said current source; and
f. means for connecting each auxiliary current path to draw current from said current source whenever none of its associated drive lines does.

7. In a read-only memory the combination comprising:
a. a plurality of magnetic cores;
b. means having a pair of outputs for driving current through a load connected across said outputs;
c. a current-limiting impedance;
d. a set of drive lines linking selected ones of said cores;
e. means for connecting a selected one of said drive lines to draw current from said current source and through said current-limiting impedance; and
f. means for drawing a compensating current through said current-limiting impedance only when none of said drive lines is connected to draw current.

8. In a read-only memory the combination comprising:
a. a plurality of magnetic cores;
b. means having a pair of outputs for driving current through a load connected across said outputs;
c. a set of drive lines linking selected ones of said cores and connected to a common point at one of their ends;

d. a current-limiting impedance connected between said common point and one of said outputs;

e. a set of switches individually connected in series between the opposite ends of respective ones of said set of lines and the other of said outputs;

f. means for closing a selected one of said switches to drive current from said source through a selected one of said drive lines; and g. means for drawing a compensating current through said current-limiting impedance when none of said set of switches is closed and for interrupting said compensating current when any of said set of switches is closed, said compensating current being comparable to the current driven through said drive lines, whereby the total current through said current-limiting impedance remains substantially unchanged.

9. A read-only memory having means for inhibiting spurious signals in nonselected drive lines comprising:

a. a current source;

b. a plurality of selectively energizable memory drive lines coupled to said source, said lines having leakage capacitances in series therewith charged by said current source;

c. control means coupled to said selectively energizable drive lines; and d. means responsive to said control means and coupled to said current source for substantially reducing the voltage variation across said leakage capacitances when one of said lines is selectively energized by said control means.

10. A read-only memory according to claim 9 and further characterized in that said responsive means includes an auxiliary current path and means for connecting said current path to draw current from said current source whenever none of said drive lines is energized.

11. A read-only memory having means for inhibiting spurious signals in nonselected drive lines comprising:

a. a current source;

b. a plurality of selectively energizable memory drive lines coupled to said source, said lines having leakage capacitances in series therewith charged by said current source;

c. an auxiliary current path having an impedance comparable to the impedance of individual ones of said drive lines; and d. means for connecting said auxiliary current path to said current source for drawing current from said source whenever none of said drive lines are energized so that the voltage variations across said leakage capacitances are minimal when any drive line is selectively energized.

12. A read-only memory in accordance with claim 11 and further characterized in that the impedance of said current path is the average of the respective impedances of said drive lines.

* * * * *

PO-1050
(5/69)

UNITED STATES PATENT OFFICE
CERTIFICATE OF CORRECTION

Patent No. 3,644,909 Dated February 22, 1972

Inventor(s) Jozef Furst

It is certified that error appears in the above-identified patent and that said Letters Patent are hereby corrected as shown below:

Col. 1, line 48, "work" should be --word--.
Col. 2, line 1, "work" should be --word--; line 36, "in" should be --is--.
Col. 4, line 47 "form" should be --from--.
Col. 5, line 11, "impedance" should be --impedances 29A and 29B corresponding to the auxiliary impedance--; line 18 "17b[" should be --17e--.

Signed and sealed this 20th day of June 1972.

(SEAL)
Attest:

EDWARD M.FLETCHER,JR.
Attesting Officer

ROBERT GOTTSCHALK
Commissioner of Patents